US008467357B2

(12) United States Patent
Wang et al.

(10) Patent No.: US 8,467,357 B2
(45) Date of Patent: Jun. 18, 2013

(54) FLEXIBLE MAC SUPERFRAME STRUCTURE AND BEACONING METHOD

(75) Inventors: Jianfeng Wang, Ossining, NY (US); Dave A. T. Cavalcanti, Ossining, NY (US); Kiran S. Challapali, New City, NY (US)

(73) Assignee: Koninklijke Philips Electronics N.V., Eindhoven (NL)

( * ) Notice: Subject to any disclaimer, the term of this patent is extended or adjusted under 35 U.S.C. 154(b) by 255 days.

(21) Appl. No.: 12/746,279

(22) PCT Filed: Dec. 5, 2008

(86) PCT No.: PCT/IB2008/055128
§ 371 (c)(1),
(2), (4) Date: Jun. 4, 2010

(87) PCT Pub. No.: WO2009/072089
PCT Pub. Date: Jun. 11, 2009

(65) Prior Publication Data
US 2010/0260085 A1    Oct. 14, 2010

Related U.S. Application Data

(60) Provisional application No. 61/012,070, filed on Dec. 7, 2007.

(51) Int. Cl.
*H04W 4/00* (2009.01)
(52) U.S. Cl.
USPC .......................................................... 370/338
(58) Field of Classification Search
USPC ............... 370/328, 338, 334; 455/450, 452.1
See application file for complete search history.

(56) References Cited

U.S. PATENT DOCUMENTS 7,312,703 B2 * 12/2007 Hoogenboom ............... 340/540
(Continued)

FOREIGN PATENT DOCUMENTS

| EP | 1530325 A1 | 11/2005 |
| WO | WO2005076543 A1 | 8/2005 |
| WO | WO2005094007 A1 | 10/2005 |
| WO | WO2007106042 A1 | 9/2007 |

OTHER PUBLICATIONS

IEEE: "IEEE Standard 802.11: Wireless LAN Medium Access Control (MAC) and Physical Layer (PHY) Specifications" Jun. 12, 2007, IEEE Computer Society, New York, US , XP002521506 Retrieved from the Internet: URL : http ://standards.i eee.org/geti eee802/ download/802.11-2007.pdf>.

*Primary Examiner* — Chandrahas Patel

(57) ABSTRACT

A flexible wireless system and method that support both centralized and distributed modes of MAC protocols, use a new recurring MAC superframe comprising: a beacon period, a data/sense/sleep period for data selective communication, sleep and channel sensing for detecting primary users in cognitive systems; and a signaling window used for exchanging network entry messages and channel reservation requests, the system including beacon operation, a peer beacon device in distributed mode and a master beacon device in centralized mode which are used to selectively participate in the beacon operation, as well as a slave beacon device associated with the master device. The system may employ controlled channel access for the beacon period, the channel access being reservation based. The invention provides a unified MAC protocol that can be adopted in the standards, and supports flexible operation in distributed mode or centralized mode, and seamless transfer from one to the other.

15 Claims, 1 Drawing Sheet

Reference MAC Structure

Figure 1:
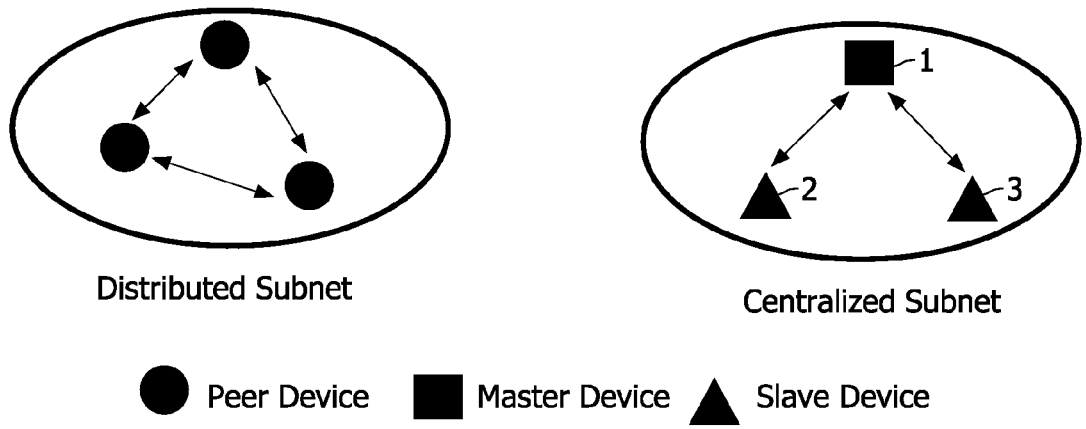

U.S. PATENT DOCUMENTS 7,957,356 B2 * 6/2011 Wang et al. .................. 370/338
8,027,288 B2 * 9/2011 Celentano et al. ............ 370/328

2002/0115458 A1 8/2002 Mizuno
2005/0249170 A1 11/2005 Salokannel

* cited by examiner

Reference Network Architecture and Device Type

Reference MAC Structure

FLEXIBLE MAC SUPERFRAME STRUCTURE AND BEACONING METHOD

A claim of priority under 35 USC §119(e) is made to U.S. Provisional Patent Application No. 61/012,070, filed on Dec. 7, 2007.

This invention generally relates to wireless radio systems and more particularly to an improved recurring MAC superframe structure and beaconing method for radio networks.

A brief outline of the MAC protocol, superframe and the deployment of beacons is believed to be conducive as background in the context of the present invention. The MAC protocol in one form is designed for operation in the 2.4 GHz ISM band with a frequency hopping radio. Any system that uses this band in the US must comply with the FCC rules. Additionally, if the band is unlicensed, the system must also be able to operate in the presence of other ISM band radio systems, and interference sources, e.g. microwave ovens.

The MAC protocol as known in one form is a hybrid protocol which combines both TDMA and CSMA/CA access mechanisms. Hybrid MAC protocols can offer features which ensure good performance under a wide range of conditions.

Framing: The MAC protocol in one form uses a superframe, which incorporates two contention-free periods (CFPs) and a contention period. The start of the superframe is the point at which a station begins to hop to a new channel and ends immediately before the station starts to hop to the next channel. The duration of the superframe is fixed and is the same as the dwell or hop period. The access mechanism used during each CFP is TDMA, whilst the access mechanism used during the contention period is CSMA/CA.

Each of the contention free periods is divided into a number of pairs of fixed length slots, two per voice connection. The first slot in each pair may be used to transmit voice data from the Control Point to a node (downlink) and the second is used to transmit voice data from a node to the Control Point (uplink).

MAC protocols in the context of the present invention can be categorized into two types: distributed and centralized. Distributed MAC protocols, such as the WiMedia MAC, have several advantages over centralized approaches for supporting P2P application scenarios, which include direct link setup, robustness and flexible channel sharing. On the other hand, centralized MAC protocols are desirable, for example, to support the scenario with a high density of devices and to support improved QoS guarantee. Clearly, each type of protocol has its advantages in some particular application scenarios, but may be sub-optimal in other cases. Therefore a flexible MAC protocol that operates in different modes and supports scenarios that require distinct features would be able to support a wider range of applications, and therefore would have a much higher market. However, current MAC protocols can only support either centralized operation or distributed operation, primarily due to the limitations of existing MAC superframe structure and related operations.

Distributed MAC protocols, such as IEEE 802.11 DCF (Distributed Coordinated Function) and 802.11e EDCA (Enhanced distributed Channel Access), have salient features for supporting P2P (peer-to-peer) applications scenarios. They support direct link setup, avoid point of failure and facilitate flexible multi-hop channel sharing. However, it is not straightforward to support QoS strict real-time applications minimize energy consumption and address the hidden terminal problem under the context of distributed approaches. The WiMedia MAC provides a distributed beaconing protocol and a distributed reservation protocol (DRP) to address such problems. But the beaconing protocol requires each device to own a beacon slot in each beacon period and send a beacon in every superframe, which leads to scalability problems due to the overhead of beacon slots in every superframe. In other words, to support high node density applications becomes very difficult due to the increasing overhead of the beacon slots with the increase of the node density.

In contrast, point coordinated or centralized MAC protocols, such as IEEE 802.11e HCCA mode (HCF controlled channel access, where HCF stands for Hybrid Coordination Function) are better to support QoS, high-density applications, and energy-saving. Centralized MAC protocols provide deterministic channel access controlled by a coordinator (access point or cluster-head) device, which improves channel usage efficiency and enables more efficient energy-saving schemes. However, the centralized architecture cannot really enable direct P2P link setup, nor avoid a single point of failure and support flexible multi-hop channel sharing.

In a managed network a beacon is transmitted immediately after the hop. This Beacon is used to maintain network synchronization, control the format of the superframe and manage when each node should transmit and receive data.

The CFP (contention Free Period) at the end of the superframe is used for the initial transmission of the voice data, whilst the CFP at the start of the superframe is used for the optional retransmission of any data which was not received or was incorrectly received. The dwell period is fixed at 20 ms to provide acceptable performance with respect to latency. The length of the dwell period also means that each voice data message contains 20 ms of ADPCM data (640 bits), equivalent to an extended DECT B-field and 48 bits of control data, equivalent to the DECT A-field. In addition each packet transmitted includes the necessary MAC and PHY headers.

With a 20 ms superframe the MAC can provide either 4 voice connections with a large enough CFP at the start of the frame to enable all the voice data to be retransmitted, or a larger number of connections (e.g. 6), but in this case the CFP at the start of the frame is only large enough for the retransmission of data from two connections.

The CFP in which initial transmission occurs and the CFP in which retransmission occurs are separated by a frequency hop, giving frequency diversity which is particularly important given the environment in which the protocol will operate.

At the end of the first CFP in the superframe there is a space reserved for a service slot. The service slot is used by voice nodes to communicate with the Control Point.

Each voice data packet transmitted by a node includes in the packet header a piggyback acknowledgement of the last voice data message received by the node. i.e. in the uplink packet, the voice node acknowledges the downlink packet sent by the control point. This system allows the control point to determine prior to a hop which voice data transmissions were lost, to determine the retransmissions required, and advertise these retransmissions in the Beacon at the start of the next superframe. Each voice data packet can only be retransmitted once.

The time between the two CFPs, the contention period, is used for data transmissions using a CSMA/CA protocol similar to that specified in the 802.11 standard [802.11]. The MAC uses a slotted contention scheme, acknowledgement and retransmission of data messages and a fragmentation scheme to improve performance.

If there is no voice connection active then the CSMA/CA period occupies the whole of the superframe, with the exception of the space required for the hop and Beacon, maximizing data throughput.

If there is no Control Point present, then the data nodes can create an ad-hoc network in which control of the network is distributed between all the nodes.

The use of beacon in management: The primary function of the Beacon is to enable all nodes to synchronize to the hopping pattern of the network.

The Beacon transmitted by the Control Point is also used to manage the network during the contention free periods. The Control Point Beacon (CPB) can include a list of active voice connections (and therefore slot assignments), retransmission slot assignments for the current superframe, connection status information and paging information.

Slot assignment and synchronization information does not change on a per frame basis, so if a node misses a Beacon, it uses the information contained in the most recent valid beacon. All connection and paging status requests and information are repeated until they are acknowledged by the target node.

To optimize the performance of the protocol the Control Point performs "connection packing" to eliminate unused slots and maximize the contention period and therefore maximize data throughput In an ad-hoc network each node schedules the transmission of an ad-hoc beacon during each dwell period. A node uses its address to determine when it should send an ad-hoc beacon preventing collision of ad-hoc beacons from different nodes. If a node receives messages from two different nodes before it is due to transmit its own beacon, then it cancels transmission of the beacon The service slot is used by voice nodes to send management messages to a Control Point, e.g., to request a connection from the Control Point. Since there is only one service slot it is possible for two nodes to transmit at the same time and for their transmissions to collide. Each management message is explicitly acknowledged by the Control Point in the CPB, and if there is no acknowledgement a node performs a random backoff across a number dwell periods before resending the message. When closing a connection, the node transmits a management in its voice slot.

This invention presents a new MAC superframe structure and a set of related operations, which are the corner stones of a MAC protocol for flexible wireless systems. The unified MAC protocol enabled by this invention could support flexible operation in either distributed mode or centralized mode, and support seamless transition from one mode to another adaptively. Moreover, the invention in one form could allow a distributed network and a centralized network to co-exist harmoniously, as well as multiple centralized networks.

Since the applications and the network topology change over time, it would be extremely useful if one unified MAC protocol could support flexible operation in either distributed mode or point-coordinated mode, and support seamless transition from one mode to another adaptively. Moreover, it would be ideal if such unified MAC protocol could allow distributed network and point-coordinated networks to co-exist harmoniously, as well as multiple point-coordinated networks. No existing wireless system provides all the above features.

Although the IEEE 802.11 standard and its 802.11e amendment do support both distributed operation (mandatory) and point-coordinated operation (optional) modes, the two modes require totally different MAC structure and operations. Therefore, the transition from one to another can not be seamless in 802.11 networks. In most cases, a device only operates in one mode, for example, the mandatory distributed mode. Co-existence is also an open problem in 802.11 networks, since QoS can not be fully guaranteed in a point-coordinated network, if it co-exists with a distributed or another centralized network.

Based on the above observation, the present invention in one form proposes a new flexible MAC structure that harmoniously supports multiple operation modes and enables a seamless transition between operation modes.

The invention in one form resides in a flexible wireless system that supports both centralized and distributed modes of MAC protocols, using a new MAC superframe structure which comprises: a new recurring MAC superframe including a beacon period; a data/sense/sleep period for data selective communication, sleep and channel sensing for detecting primary users in cognitive systems; and a signaling window used for exchanging network entry messages and channel reservation requests. The flexible wireless system expediently includes beacon operation, a peer beacon device in distributed mode and a master beacon device in centralized mode which are used to selectively participate in the beacon operation, as well as a slave beacon device associated with the master device. The system may include controlled channel access for the beacon period, wherein the channel access is reservation based. Preferably, the signaling window may be located at the end of the MAC superframe structure.

The invention in a second form resides in a flexible wireless system that supports both centralized and distributed modes of MAC protocols, which uses a new MAC superframe structure comprising: a new recurring MAC superframe including a beacon period; a data/sense/sleep period for data selective communication, sleep and channel sensing for detecting primary users in cognitive systems; a signaling window used for exchanging network entry messages and channel reservation requests, the system including beacon operation, a peer beacon device in distributed mode and a master beacon device in centralized mode which are used to selectively participate in said beacon operation, as well as a slave beacon device associated with said master device.

In another form, the invention resides in a method for a wireless system that flexibly supports both centralized and distributed modes of MAC protocols, which uses a new MAC superframe structure the method comprising: deploying a new recurring MAC superframe including using a beacon period; using a data/sense/sleep period for data selective communication, sleep and channel sensing for detecting primary users in cognitive systems; deploying a signaling window used for exchanging network entry messages and channel reservation requests; the method including a beacon operation using a peer beacon device in distributed mode and a master beacon device in centralized mode which are used to selectively participate in the beacon operation, as well as using a slave beacon device associated with the master device.

Figure 2:
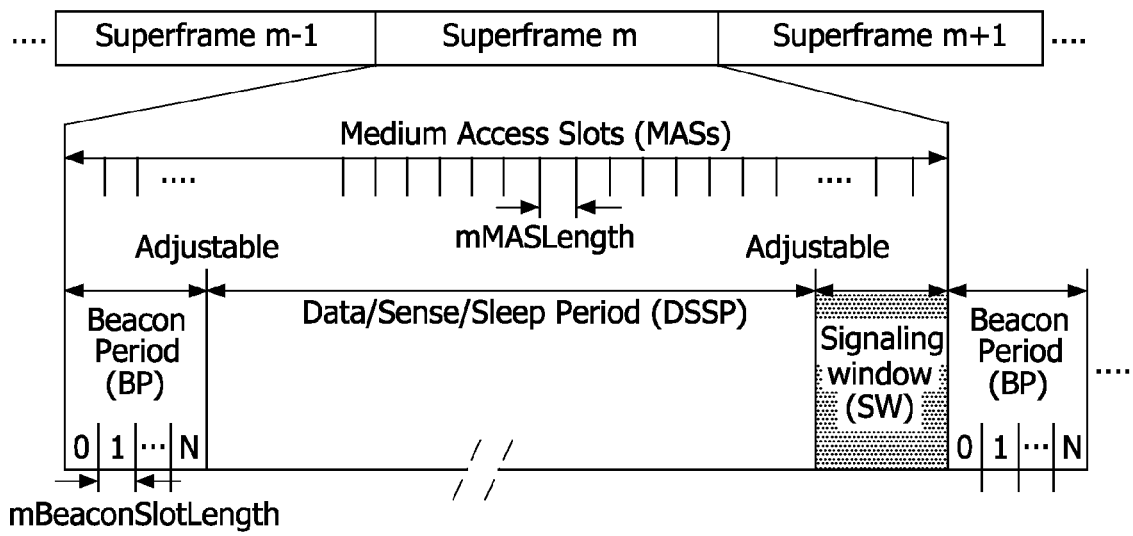

A more detailed understanding of the invention may be had from the following description of preferred embodiments, given by way of example and to be understood in conjunction with the accompanying drawing wherein:

FIG. 1 illustrates a reference network architecture and device type in the context of the present invention; and, FIG. 2 illustrates an exemplary reference MAC Structure embodying the invention.

A detailed description of one or more embodiments of the invention is provided below in the context of the accompanying figures that illustrate by way of example the principles of the invention. While the invention is described in connection with such embodiments, it should be understood that the invention is not limited to any embodiment. On the contrary, the scope of the invention is limited only by the appended claims and the invention encompasses numerous alternatives, modifications and equivalents. For the purpose of example, numerous specific details are set forth in the following description in order to provide a thorough understanding of the present invention.

The present invention may be practiced according to the claims without some or all of these specific details. For the purpose of clarity, technical material that is known in the technical fields related to the invention has not been described in detail so that the present invention is not unnecessarily obscured.

Definition of subnet and Device type in the context of the present invention: In this invention, a Subnet is defined as a collection (or group) of devices which are under the management of one entity (e.g., network administrator) and share a common MAC protocol. If the medium access in the subnet is controlled by a single device, a subnet is defined as a Centralized Subnet. On the other hand, if the medium access in the subnet is coordinated in the distributed manner, a subnet as a Distributed Subnet. As illustrated in FIG. 1, as applied in the present invention, there are three basic types of devices. A device in a distributed subnet is called a Peer Device; the subnet coordinator in a centralized subnet is called a Master Device; and, a device other than subnet coordinator in the centralized subnet is called a Slave Device. At any given time, a device can only operate as one of the three types, i.e., a device can either be a Master, Slave or Peer device. Also, two subnets as are referred to Neighboring Subnets if the two subnets share the same channel and at least one active device from the first subnet is in the transmission range of the second subnet.

A Flexible MAC (Flex-MAC) Superframe Structure:

As illustrated in FIG. 2, the proposed MAC protocol follows a recurring Superframe structure, which consists of a beacon period (BP), data/sense/sleep period (DSSP) and a signaling window (SW). The signaling window and beacon period are used for broadcasting/exchanging control/management information and their sizes (in time slots) are dynamically adjustable.

All devices in the connected subnets which share the same channel shall follow the same Superframe structure. Superframe merging is necessary if two subnets, which follow different Superframe structures and share the same channel, become neighbors.

All the devices should keep awake during beacon period and signaling window in order to capture all the control/management information which may be relevant to every device. A device may exchange data, monitor one or more channels (needed in cognitive networks), or go to sleep mode during Data/Sense/Sleep period.

For purposes of this invention, a device is treated as a beaconing device if it owns a beacon slot in a beacon period BP and regularly transmits beacons. Different from WiMedia, not every device is required to be a beaconing device, which allows the flexibility and scalability. Whether a device should become a beaconing device for purposes of this invention will depend on the following considerations:

A peer device should be a beaconing device. A master device must be a beaconing device. In other words, a master device must own one dedicated beacon slot in the beacon period. There could be multiple master devices in the same network, each of which controls a group of slave devices. In such case, each master device shall own one beacon slot in the beacon period.

A slave device is normally a non-beaconing device, which does not own a beacon slot in the beacon period. But in certain scenarios, a slave device could be a beaconing device, e.g., to enable co-existence and reduce a hidden terminal problem.

The considerations above can be used to help establish a beaconing backbone across the connected subnets. With the beaconing backbone and the dedicated use of beacon slots, those devices in a coordination role or in real-time and intensive transmission can easily guarantee control information (including bandwidth reservation information) reliably and timely delivered, thus improving QoS support and system reliability.

One significant component in the proposed MAC is the synchronization. To synchronize the devices, all the devices in the connected subnets should follow the same BPST (Beacon Period Start Time) and the same superframe number. The BP starting time and superframe number are initiated by the first device establishing the beacon period, which could be a master device or a peer device. The merging of BPST and superframe structure is necessary if two disconnected subnets become connected.

Beacon period (BP) operation: The channel access method for beacon period is reservation based, specifically TDMA based. Beacon period is divided into multiple equal beacon slots, numbered from zero and increased one by one. The starting time of the Superframe is equivalent to the starting time of the first beacon slot. Each beaconing device owns one beacon slot, sends a beacon in its own beacon slot and listens to other beacon slots. This is similar as WiMedia.

A new beaconing device should preferably select the smallest available beacon slot in the BP as its own beacon slot. For example, if a device is the very first device which initiates BP, it should choose beacon slot zero as its own beacon slot number. A beaconing device should regularly send a beacon in its own beacon slot.

A beaconing device should use the beacon to advertise its own superframe number, device type (illustrated in Table 1), subnet ID (which could be a name string, e.g., configured by subnet owner), the SW length, in addition to what is defined in WiMedia standard for example, Beacon Period Occupancy IE (BPOIE, which includes BP length), DRP Availability IE, PCA Availability IE, Traffic Indication Map (TIM) IE, Identification IE. By the above information indicated in beacon, every device in the network knows the Superframe structure and channel reservation status. An exemplary format of the beacon is illustrated in Table 3.

TABLE 1

Illustration of Device Type Encoding

| Value | Device type |
|---|---|
| 0 | Master Device |
| 1 | Peer Device |
| 2 | Slave Device |

TABLE 2

Illustration of Subnet ID format

| Syntax | Size |
|---|---|
| Subnet_ID_Format( ) { | |
| Length (=N) | 1 byte |
| Name String | N byte |

TABLE 3

Illustration of Beacon Frame Payload Format

| Syntax | Size | Notes |
| --- | --- | --- |
| Beacon_Frame_Payload_Format( ) | | |
| Device Identifier | 6 bytes | Defined through EUI-48 |
| Superframe Number | 2 bytes | The device first establishing beacon period will initialize the superframe number. The superframe number increments once per superframe, following a modulo counter. |
| SW length | 1 byte | In terms of the number of MASs |
| Device Type | 1 byte | Defined in Table 1. |
| Subnet ID | Variable | Defined in Table 2 |
| For(i=1, i<=N, i++){ | | |
| $IE_i$ | variable | Information element. |

Beacon period length is adjustable between minimum BP length ($BP_{min}$, e.g. one beacon slot) and maximal BP length ($BP_{max}$). Upon establishing the beacon period, the BP length is of the minimum length by default. When a new beaconing device requests to join the BP, the beacon period may be extended. When a beaconing device leaves the network, the beacon period may be downsized and the beacon slots may be shifted to lower numbered slots.

The procedures to extend or shrink the BP, as well as shifting beacon slots are not dwelt upon in further detail herein. But the general requirement for BP extension is to ensure that each beaconing device be aware of the BP adjustment request and confirm such adjustment request. For example, every beaconing device should confirm/update/advertise such BP adjustment in its beacon.

Signaling Window (SW) Operation

A signaling window is an adjustable time window that is used for exchanging control or management information, for example, network entry messages, channel reservation requests and traffic indication. A signaling window is preferably placed at the end of a Superframe. However, it may be positioned in another location, e.g., after BP, according to system preference.

Any device may use the signaling window to send control/management information on demand. Different from beacon period, the whole signaling window is shared by all the devices depending on the opportunity; thus improving channel efficiency for signaling. The advantages of using a reserved signaling window instead of other randomly available MAS in DSSP to exchange control information are energy-saving and reliability. For example, a device can go to sleep mode during DSSP without missing control message.

Although a device can still use any available MAS in DSSP for exchanging control information, it may require all the intended receivers to keep awake during DSSP, which reduces energy efficiency. Moreover, MASs in DSSP may not be available during "peak data traffic time", which could cause intolerable delay to critical control messages, such as channel-switch-messages to protect primary users in cognitive radio systems.

Signaling window duration is adjustable between minimum SW length ($SW_{min}$) and maximal SW length ($SW_{max}$). Any beaconing device in the network may ask to extend the current signaling window if the signaling window becomes overloaded. Many ways can be used to judge whether the signaling window is overloaded, such as observing collision probability, channel utilization ratio and measurement reports from other devices. If the signaling window gets overloaded, a beaconing device may include an information element in its beacon to request such SW extension. Every beaconing device receiving such request should extend the SW accordingly.

The channel access method for signaling window is contention based. Slotted aloha or back-off based carrier sensing medium access (CSMA) could be used for the contention. For slotted aloha method, based on the fact that the maximal signaling message length is much less than the maximum length of a regular Medium Access Slot (MAS), the signaling slot length should be smaller than the regular MAS slot length.

DSSP Operation

The use policy of medium access slots (MAS) in DSSP should follow either Reservation Access or Prioritized Contention Access (PCA) or Group-PCA. The reservation access and PCA can be applied to both distributed subnet and centralized subnet. The Group-PCA is applied to the centralized subnet only. The use policy is published by beaconing devices and it can be updated on a Superframe-basis. A beaconing device should always publish its own view of use policy for every MAS in DSSP. Accordingly, a master device should announce all the reservation related with itself as well as its associated slave devices.

A medium access slot marked as reservation can be accessed preferably only by the reservation owner.

A medium access slot marked as PCA available is open to all the devices in the network. In addition to pure contention (open to public) and pure reservation (open to reservation owner only), we also propose the Group-PCA is also proposed, which is only open to a specific subnet, for example a master device and its slave devices. In this case, the master device should make reservation, label the owner suitably and mark the reserved MASs as Group-PCA. Within Group-CPA available slots, the master device may have higher priority than slave devices to access medium, e.g., to send Poll messages.

Exemplary methods to implement the present invention: The proposed invention could serve as a basis for future WiMedia UWB standard, IEEE 802.11, Cognitive wireless networks, and IEEE 802.15 wireless systems, but the implementation is not limited thereto.

In the foregoing detailed description of embodiments of the invention, various features are grouped together in a single exemplary embodiment for the purpose of streamlining the disclosure. This method of disclosure is not to be interpreted as reflecting an intention that the claimed embodiments of the invention require more features than are expressly recited in each claim. Rather, as the following claims reflect, inventive subject matter lies in less than all features of a single disclosed embodiment. Thus the following claims are hereby incorporated into the detailed description of embodiments of the invention, with each claim standing on its own as a separate embodiment. It is understood that the above description is intended to be illustrative, and not restrictive. It is intended to cover all alternatives, modifications and equivalents as may be included within the spirit and scope of the invention as defined in the appended claims. Many other embodiments will be apparent to those of skill in the art upon reviewing the above description. The scope of the invention should therefore be determined with reference to the appended claims, along with the full scope of equivalents to which such claims are entitled. In the appended claims, the terms "including" and "in which" where present, are used as the plain-English equivalents of the respective terms "comprising" and "wherein," respectively. Moreover, the terms "first," "second," and "third," etc., are used merely as labels, and are not intended to impose numerical requirements on their objects.

The invention claimed is:

1. A communication method that flexibly supports both centralized and distributed modes of MAC protocols in a wireless system, said method comprising:
deploying a new recurring MAC superframe structure (m−1, m, m+1) including
using a beacon period (BP), the device mandatorily transmits a beacon in the beacon period if the device operates as a master device, which coordinates a centralized subnet, and if the device operates as a peer device in a distributed subnet, and wherein a device refrains from transmitting a beacon if the device operates as a slave device;
using a data/sense/sleep period (DSSP) for data selective communication, sleep, and channel sensing for detecting primary users in cognitive systems;
deploying a signaling window (SW) that is separate from the beacon period and used for exchanging control management information via network entry messages and channel reservation requests, wherein the signaling window is usable by any device, irrespective of whether the device operates as a master device, a slave device, or a peer device.

2. A device for use in a flexible wireless system that supports both centralized and distributed modes of MAC protocols, the device being adapted to operate, at any given time, as one of three types: a master device, a slave device, and a peer device, the device coordinating a centralized subnet when operating as a master device, the device participating in a centralized subnet other than as a subnet coordinator when operating as a slave device, and the device participating in a distributed subnet when operating as a peer device, the device being adapted to communicate using a recurring MAC superframe structure comprising:
a beacon period, the device being adapted to mandatorily transmit a beacon in the beacon period if the device operates as a master device or a peer device, the device being adapted to refrain from transmitting a beacon if the device operates as a slave device;
a data/sense/sleep period, the device being adapted to carry out at least one of the following operations in the data/sense/sleep period: data selective communication, sleep, and channel sensing for detecting primary users in cognitive systems; and
a signaling window separate from the beacon period, the device being adapted to use the signaling window for exchanging control/management information via messages such as network entry messages and channel reservation requests, irrespective of whether the device operates as a master device, a slave device, or a peer device.

3. The device as in claim 2, wherein the device is adapted to carry out controlled channel access for said beacon period (BP), wherein the channel access is reservation based.

4. The device as in claim 3, wherein the device is adapted to carry out the channel access that is TDMA based.

5. The device as in claim 2, wherein the device is adapted to transmit a beacon in one of multiple equal beacon slots (0, 1 . . . n) into which the beacon period (BP) is divided, the beacon slots being numbered from zero and increased one by one.

6. The device as in claim 5, wherein the device is adapted to send a beacon in a particular beacon slot, which is owned by the device, and to listen to other beacon slots.

7. The device as in claim 5 wherein the device is adapted to use its beacon to selectively advertise its own superframe number, device type, subnet ID, and signaling window length in addition to advertising what is defined in applicable existing standards.

8. The device as in claim 2, wherein the device is adapted to confirm, update, and advertise an adjustment of a length of said beacon period when transmitting a beacon, wherein the length is adjustable between a predetermined minimum number of slots and a maximum.

9. The device as in claim 2, wherein the device is adapted to carry out a contention based channel access method for the signaling window.

10. The device as in claim 9, wherein the device is adapted to choose said contention based channel access method from slotted aloha and Carrier sensing Medium Access, wherein a signaling slot length smaller than a regular medium-access-slot (MAS) length is used.

11. The device as in claim 2, wherein the device is adapted to carry out selective data communication in the data/sense/sleep period according to a use policy that is published in the beacon period by beacon-transmitting devices.

12. The device as in claim 11, wherein the device is adapted to request to join the beacon period, wherein the beacon period is extended, and to leave the beacon period, wherein the beacon period is downsized.

13. The device as in claim 11, wherein the device is adapted to request an extension of said signaling window (SW) between a minimum length and a maximum length, if the device operates as a beacon-transmitting device.

14. The device as in claim 13 wherein the device is adapted to include an information element in its beacon, the information element representing a request for extension of the signaling window (SW).

15. A flexible wireless system that supports both centralized and distributed modes of MAC protocols, which uses a MAC superframe structure comprising a recurring MAC superframe including:
a beacon period (BP),
a data/sense/sleep period (DSSP) for data selective communication, sleep and channel sensing for detecting primary users in cognitive systems, and
a reserved signaling window (SW) separate from the beacon period that is used for exchanging network entry messages and channel reservation requests;
wherein the flexible wireless system supports a beacon operation, the system including a peer beacon device in distributed mode, and a master beacon device in centralized mode which are used to selectively participate in said beacon operation, as well as a slave beacon device associated with said master device;
wherein the signaling window (SW) is configured and open to be used by any said device, including new devices and non-beaconing slave devices;
wherein said signaling window (SW) has duration that is adjustable between a minimum SW length and a maximum SW length; and
wherein a beaconing device includes an information element, wherein if a signaling window (SW) gets overloaded, said information element requests SW length extension.

* * * * *